United States Patent
Bach et al.

[15] 3,679,159
[45] July 25, 1972

[54] VIBRATION ISOLATION STRUCTURE

[72] Inventors: Bert Bach, 270 West End Avenue, New York, N.Y.; Eliot S. Gerber, 7 Frog Rock Road, Armonk, N.Y. 10504

[22] Filed: Feb. 9, 1971

[21] Appl. No.: 114,009

[52] U.S. Cl. ..................................248/22, 248/400, 267/153
[51] Int. Cl. .........................................................F16f 15/08
[58] Field of Search .............248/22, 24, 15, 9, 400, 358 R; 267/153, 152, 141, 140; 188/1 B; 108/136

[56] References Cited

UNITED STATES PATENTS

| | | | |
|---|---|---|---|
| 3,228,638 | 1/1966 | Burch | 248/22 |
| 3,251,076 | 5/1966 | Burke | 188/1 B X |
| 3,154,273 | 10/1964 | Paulsen | 248/22 |
| 3,351,027 | 11/1967 | Ellard et al. | 248/22 UX |
| 1,929,201 | 10/1933 | Frohlich et al. | 248/10 X |
| 3,425,652 | 2/1969 | Leary | 267/153 X |
| 2,076,071 | 4/1937 | De Bolt | 248/22 |
| 3,233,885 | 2/1966 | Propst | 267/153 X |

FOREIGN PATENTS OR APPLICATIONS

| | | | |
|---|---|---|---|
| 303,004 | 8/1929 | Great Britain | 248/22 |
| 601,821 | 5/1948 | Great Britain | 248/24 |
| 1,272,049 | 7/1968 | Germany | 248/24 |

*Primary Examiner*—J. Franklin Foss
*Attorney*—Eliot S. Gerber

[57] ABSTRACT

A structure to reduce vibration consists of a rigid bottom plate and a rigid top plate which may act as a vibration reducing platform. The plates are kept separated, in one embodiment, by a large number of fluid-filled separate containers having thin flexible walls. Preferably the containers are spheres held in a web and filled with air at above atmospheric pressure. In another embodiment the plates are separated by an elongated fluid-filled tube which forms a substantially closed curve in plan view.

5 Claims, 8 Drawing Figures

PATENTED JUL 25 1972

INVENTORS
BERT BACH
ELIOT S. GERBER

BY

*Eliot S. Gerber*
ATTORNEY

INVENTORS
BERT BACH
BY  ELIOT S. GERBER

Eliot S. Gerber
ATTORNEY

3,679,159

VIBRATION ISOLATION STRUCTURE

BACKGROUND OF THE INVENTION

The present invention relates to the reduction of noise pollution and the reduction of vibration transfer, and more particularly to a vibration table (class 248–22), i.e., a platform upon which is mounted a machine or instrument to be isolated from vibration transfer to, or from, its support.

At the present time the rise of traffic and population density has caused an increased problem for those doing scientific work. They have found, for example, that accurate microscopic examination and microphotography of tissue is disturbed by trucks or trains passing outside the building. To alleviate that problem a number of companies sell "vibration tables," which consist of a platform upon which the measuring instrument may be mounted. Generally vibration tables consist of a platform suspended by carefully tuned springs. Such vibration tables are expensive, usually above $500, and are adapted to filter out only one range of vibration frequencies.

It has also been suggested that a vibration isolator may be constructed using a large bladder filled with air under pressure or a flexible sponge-like material. However, if the weight on the table is not exactly centered, it will tilt on the bladder and the sponge either becomes compressed or transmits vibrations.

A somewhat similar problem of vibration transfer occurs when vibrating machinery is mounted on a floor. If bolted or stood on the floor, it transmits its vibrations, which are noisy and fatiguing to the workers, the floor acting as a sounding or resonating board amplifying the noise many times. In a factory such noise pollution, it is believed, leads to health problems and discomfort. It has been suggested that cork, felt and similar material be used beneath such machines. Such materials help, but even they transmit noise at certain frequencies.

OBJECTIVES OF THE INVENTION

It is an objective of the present invention to provide a vibration table which (a) is sufficiently low in cost that it may be widely available to students and others, (b) functions to filter out vibrations over the entire broad range of frequencies which are likely to be encountered; (c) does not require the services of skilled personnel to install, maintain or replace; (d) may be shipped without the likelihood of damage; (e) is sufficiently rugged so it will not be damaged in use; (f) if damaged, may be readily and inexpensively replaced; and (g) may readily be altered or adapted as to its range of frequency filtering and its weight per sq./ft. of loading.

It is a further objective of the present invention to provide a platform to isolate the vibrations and noise of machinery, which platform: (a) is relatively inexpensive; (b) is easy to install and replace; (c) does not require extensive maintenance; (d) may readily be changed or adapted to match the frequency range of the vibrations produced by the machine.

SUMMARY OF THE INVENTION

The structure of the invention consists of a flat bottom plate which is intended to be mounted or placed on the floor, a table, legs, or other support. A second flat plate is the top plate and upon its top surface is mounted or placed the device to be vibration isolated, for example, a microscope or noisy machinery. The two plates are kept separated by a vibration reducing material consisting of a number of fluid-filled containers, the containers having thin and flexible skins. For example, the containers are plastic film spheres (bubbles) filled with air under pressure or one or more elongated tubes forming a closed curve in plan view.

The ideal vibration isolator is a vacuum and perhaps next best a gas. However, the gas must be contained. The present invention supports the load on thin film bubbles which are filled with fluid. With a weight on the top plate the bubbles will be compressed, compressing the fluid and placing the skin (film) of the bubbles under compression. The only solid material, as distinct from the fluid filling the bubbles, between the two plates is film under compression, which film transmits vibration only over a narrow range and even in that range greatly attenuates vibration. In addition, if the weight on the top plate is not exactly at its center, some of the bubbles will be more compressed than others; however, the rise in pressure of the fluid in those bubbles will not be communicated to the fluid within the other bubbles.

DESCRIPTION OF THE PREFERRED EMBODIMENTS

Figure 1:
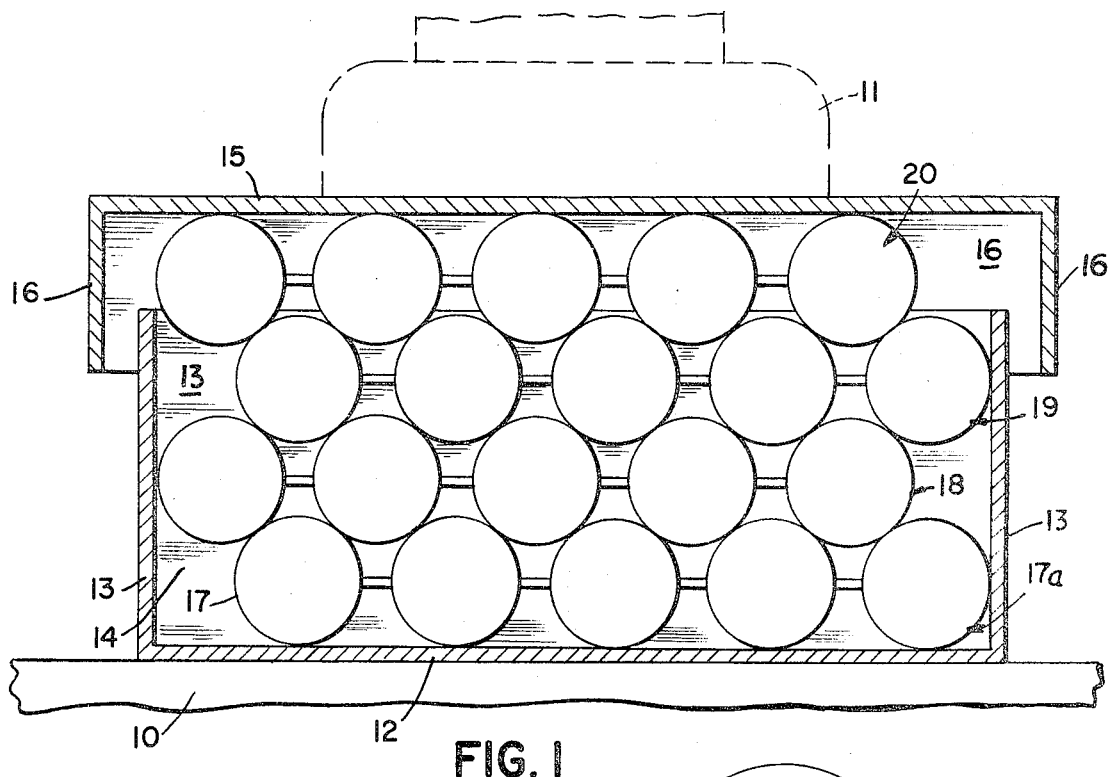
FIG. 1 is a side plan view of the structure of the first embodiment of the present invention.

As shown in FIG. 1, the vibration attenuation structure of the present invention is intended to be maintained on a table 10, although other supporting means such as legs may be used. The vibration attenuation structure of the embodiments of the invention may be used either to:

(a) reduce the vibration, and consequently the noise, from a vibrating object which is positioned on the top of the structure; or (b) reduce vibrations from the environment, transmitted through the table 10, which might be otherwise transmitted to the instrument positioned on top of the structure. As an example of the first use, a noisy machine, such as a punch press, may be positioned on top of the structure. The noise and vibrations will be attenuated by the structure of the present invention so that the noise and vibrations transmitted to the environment, for example, to the workers in a factory, will be reduced. As an example of the second use, a delicate precision instrument, such as a microscope, would be positioned on top of the structure and be less subject to the adverse effects of vibrations from the table on which the structure is positioned, for example, the vibrations arising from passing trucks or trains.

The device 11 on top of the structure is shown as dashed lines and may either be a noisy device, such as a lathe or a punch press, or might be a delicate instrument, such as a microscope. The structure itself comprises a first panel 12 which is adapted to be positioned on the table 10. If desired, the bottom of the panel 12 may have rubber sheet pieces or adhesives to increase the friction between the bottom of the panel 12 and the top of the table 10.

As shown in has 1, the structure of the present invention is generally, as seen from the top, a rectangle, although other shapes might be used. The panel 12 has four side walls 13 which form a cavity 14. The side walls are for aesthetic reasons and also help to position the material within the cavity 14. It is important, however, that the side walls 13 do not touch, even under the normal weight for which the structure is adapted, the top panel 15. The top panel 15 has a descending flange 16 around its four sides. The flange 16 is purely for aesthetic reasons and should not touch the upraised walls 13.

The cavity 14 has within it at least three individual containers in one plane (not three layers) which are filled with fluid and have flexible walls. As shown in FIG. 1, each of the containers 17 is spherical, although containers of other shapes may alternatively be employed. There are shown in FIG. 1 four layers of containers, namely, layers 17a 18, 19 and 20. Preferably the layers have fluids which vary in their vibration damping characteristics, for example, all the spheres of layer 17a are filled with air at 15 lbs. pressure per square inch, i.e., above automatic pressure. All the spheres of layer 18 are filled with a damping liquid, preferably a silicon liquid, manufactured by the Dow-Corning Corporation of Midland, Michigan. The spheres of layer 19 are filled with water and the spheres of layer 20 are filled with air under 12 lbs. per square inch pressure above atmosphere. The weight on the table should be less than the weight which will greatly compress the air-filled spheres. Each of the spheres or bubbles consists of a wall which is thin and flexible and able to maintain its fluid contents against leakage over a long period of time. A preferred material for this purpose is a sheet of 8 mil thickness polyurethane plastic resin which is coated with a 0.5 mil thickness on the outside of "Saran," Dow Chemical Corporation's name for a biaxially oriented polyethylene terephthalate.

Figure 2:
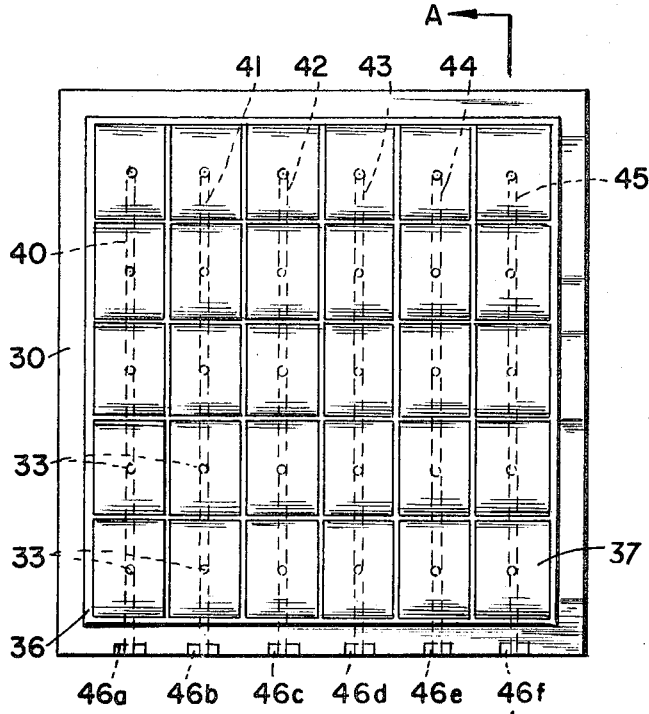
FIG. 2 is a top plan view of the second embodiment of the present invention.
Figure 3:
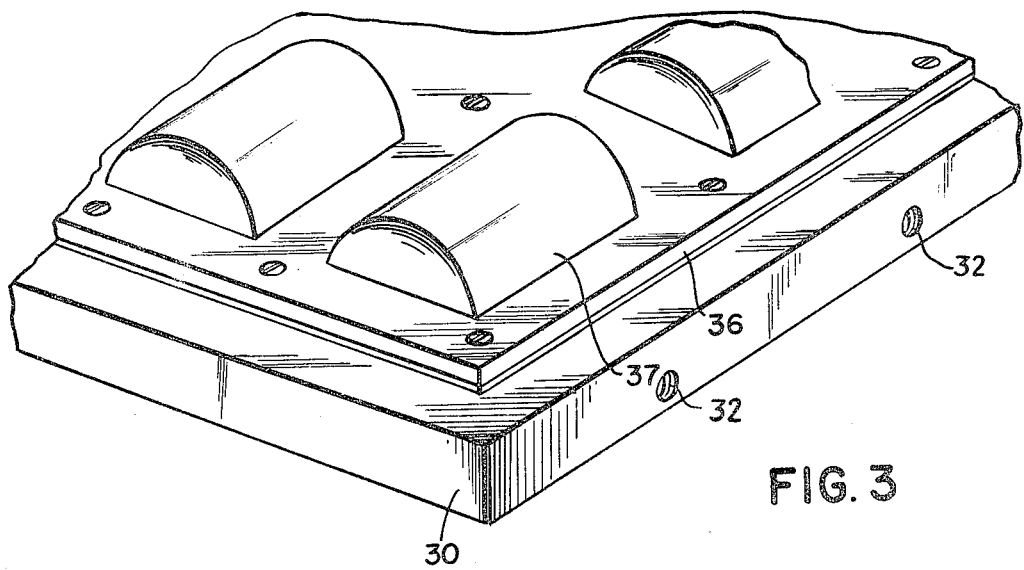
FIG. 3 is a perspective view of the embodiment of FIG. 2.
Figure 4:
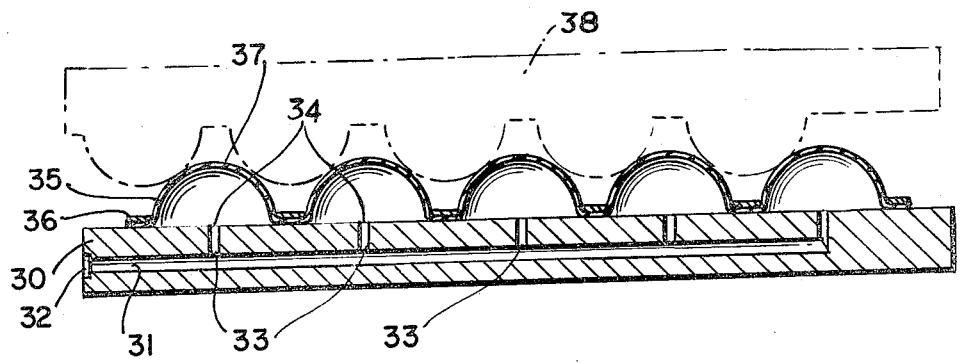
FIG. 4 is a cross-sectional view taken along line A-A of FIG. 2 looking in the direction of the arrows.

An alternative structure is shown in FIGS. 2-4. In FIG. 2 the bottom panel 30 is a thick metal or plastic block having an elongated horizontal gas tube 31 with an entry port 32 and a plurality of vertical gas tubes 33 which connect with the horizontal gas tube 31, each of the vertical gas tubes 33 terminating at the top face of the panel 30 in a gas exit port 34. A thin flexible sheet of rubber 35, having at least 10 percent of butyl rubber mixed with 90 percent natural latex rubber is positioned over the face of the panel 30. A grid 36 of metal strips is positioned over part of the sheet 35. The grid is fastened securely down to the panel 30 by means of screws or rivets, so that the rubber sheet is held in a gas or air sealed relationship between the grid and the top of the panel 30. Air pressure is then applied through the port 32 which results in pressure to each of the ports 34. The pressure causes gas filled bubbles 37 to be formed over each port 34. It is these gas filled bubbles which act as the vibration isolating elements. Similarly, plate 38, shown in dashed outline in FIG. 2, is positioned with its gas filled bubbles directed downward and its on the gas filled bubbles of the lower plate 30. The plate 38 is consequently the top supporting plate of the structure.

Each row of bubbles is connected together by a fluid passage tube 40, 41, 42, 43, 44, 45, see FIG. 2. Each passage tube 40-45 is individually sealed by a fluid-tight one-way valve, for example, an air valve of the tire valve type 46a-46f. A weight placed on the bubbles of one row will not affect the pressure of the fluid within the bubbles of the other rows.

Figure 5:
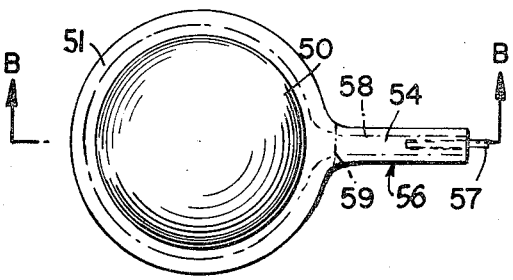
FIG. 5 is a top plan view of one type of bubble.
Figure 6:
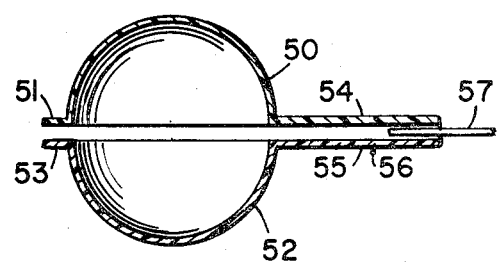
FIG. 6 is a side cross-sectional view taken along line B—B of FIG. 5.

An example of a suitable method of producing the fluid filled bubbles is shown in connection with FIGS. 5 and 6. The bubble is constructed of a first hemisphere 50 having an outwardly directed flange 51 around its base and a second hemisphere 52 having an outwardly directed flange 53 around its base. The two hemispheres are joined by adhering their flanges, for example, by adhesion, heat welding or high frequency sealing. The wall material of the bubble is flexible, for example, it preferably is polyurethan resin film of 10 mil thickness which is coated with Saran of 0.5 mil thickness.

The flanges 51 and 53 each have a protruding lip respectively 54 and 55, see FIG. 6. The lips 54 and 55 are sealed to form a tube 56 along the dot-dash line 58. A needle 57 is then inserted in the tube and air under pressure forced into the bubble, for example, the fluid suitably is air at 15 lbs. per square inch above atmospheric pressure. The needle 57 does not penetrate all the way into the tube 56 so that, with the pressure contained in the bubble by the needle, the tube is sealed along the dashed line 59, forming a sealed container.

Each bubble is then inserted in a hole in a plastic film and its flange adhered to the film. The film retains the bubble in position.

An an alternative method of producing the fluid filled flexible bubbles, two sheets of flexible material may be laid each on a separate mold having a number of hemispherical depressions. Vacuum ports at the bottoms of the depressions pull the film into the hemispherical shape. Both molds are then placed in a closed chamber having within it a high air pressure, or example, 15 p.s.i.a. The two molds are then brought together, face to face, and the touching sheets sealed together, forming a number of air-filled spheres and a connecting web of double thickness film. The molds would then be removed from the chamber and the formed spheres and web removed from the mold.

Figure 7:
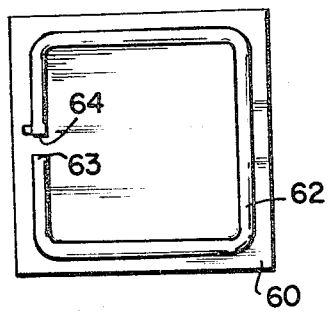
FIGS. 7 and 8 are top plan views of further embodiments of the present invention, the figures showing the top plate removed and the flexible fluid-filled tube exposed.
Figure 8:
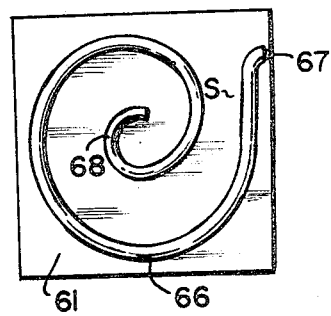

Further embodiments of the present invention are shown in FIGS. 7 and 8. In those embodiments atop plate (not shown) and a bottom plate, respectively 60 and 61, are used as in the other prior described embodiments. However, the top plate is kept separated and vibration isolated form the bottom plate by a single fluid-filled and flexible walled elongated tube forming almost a closed curve. The tube 62 is preferably of the same thin flexible rubber or plastic resin film as described above and forms almost a closed square in outer space, seen in top plan view. The shape is not closed because of the gap between the two closed ends 63 and 64. A one-way valve is positioned near the end 64. If weight is placed on one side of the top plate, it will cause little displacement and will not cause the two plates to touch.

The tube 66 of FIG. 8 is similar in construction to the tube 62 of FIG. 7. The tube 66 terminates in a one-way air valve 67. The tube 66 is in the form of an Archimedes spiral. Except for the gap S, the tube 66 forms a closed curve. The inner portion 68 of the tube provides additional support at the center.

Modifications may be made in the above-described embodiments within the scope of the subjoined claims. For example: (1) the fluid-filled containers may be spherical bubbles which are not connected by a web and the top and bottom plates may have curved cavities within each of which a portion, less than a hemisphere, of the bubbles fits; (2) the tubes 62 and 66 may be formed of two, three or more individual fluid-filled tubes placed end-to-end; (3) there may be a combination of bubbles and tubes separating the plate; (4) a plurality of thin round tubes may be interwoven; (5) for heavy machinery the rubber or plastic walls of the bubbles may be reinforced by fabric threads or steel woven wire; and (6) for tables which support stronger weights a plurality of tubes may be arranged one inside the other in a concentric manner.

I claim:

1. A vibration isolating device consisting of a first panel intended to be positioned on a supporting structure, a second panel adapted to be the platform to support a device to be vibration isolated, and a plurality of at least three fluid-filled containers in one plane positioned between said panels and separating said panels from each other, each container having its wall of flexible sheet material, wherein at least one of said panels has fluid passages leading to its ports at its internal surface, the containers are formed by fixing a film to said panel to form a fluid-tight seal and leaving the film free from the panel at the location of said ports.

2. A device as in claim 1 wherein the fluid is air at above atmospheric pressure.

3. A device as in claim 1 wherein the fluid is a silicon damping liquid.

4. A device as in claim 1 wherein the sheet is a rubber sheet.

5. A device as in claim 1 and including a grid positioned over said film and screwed to said panel to fix said film in sealing relationship to said panel.

* * * * *